US012581456B2

(12) United States Patent
Hwang et al.

(10) Patent No.: US 12,581,456 B2
(45) Date of Patent: Mar. 17, 2026

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seunggye Hwang, Seoul (KR); Jaehyung Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 425 days.

(21) Appl. No.: 18/021,344

(22) PCT Filed: Oct. 20, 2021

(86) PCT No.: PCT/KR2021/014717
§ 371 (c)(1),
(2) Date: Feb. 14, 2023

(87) PCT Pub. No.: WO2022/086174
PCT Pub. Date: Apr. 28, 2022

(65) Prior Publication Data
US 2023/0300789 A1    Sep. 21, 2023

(30) Foreign Application Priority Data
Oct. 23, 2020    (KR) ........................ 10-2020-0138137

(51) Int. Cl.
*H04W 68/00* (2009.01)
*H04W 72/1273* (2023.01)
(52) U.S. Cl.
CPC ..... *H04W 68/005* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 11,382,127 | B2 * | 7/2022 | Khoshnevisan | .. H04W 72/0446 |
| 2021/0099985 | A1 * | 4/2021 | Ang | ...................... H04W 72/23 |

(Continued)

FOREIGN PATENT DOCUMENTS

| | | |
|---|---|---|
| KR | 20190113868 | 10/2019 |
| WO | 2019099661 | 5/2019 |

(Continued)

OTHER PUBLICATIONS

Huawei, et al. "Paging enhancement(s) for UE power saving in IDLE/inactive mode," R1-2005262, 3GPP TSG RAN WGI Meeting #102-e, Aug. 8, 2020.

*Primary Examiner* — Jamaal Henson
(74) *Attorney, Agent, or Firm* — BRYAN CAVE LEIGHTON PAISNER LLP

(57) ABSTRACT

User equipment according to an embodiment of the present disclosure may detect first DCI for a paging early indicator (PEI), monitor second DCI for paging on a paging occasion (PO) of a first slot related to the PEI, on the basis of detecting the first DCI, and receive a paging message through a PDSCH scheduled by the second DCI, and preferably, the user equipment may determine, on the basis of the first DCI for the PEI, before the monitoring of the second DCI on the PO, whether the second DCI is configured to schedule the PDSCH on the first slot on the basis of same-slot scheduling or configured to schedule the PDSCH on a second slot different from the first slot on the basis of cross-slot scheduling.

11 Claims, 12 Drawing Sheets

(56) References Cited

U.S. PATENT DOCUMENTS

| | | | |
|---|---|---|---|
| 2022/0167386 A1* | 5/2022 | Takeda .................. | H04W 72/23 |
| 2022/0210736 A1* | 6/2022 | Ye ..................... | H04W 52/0235 |

FOREIGN PATENT DOCUMENTS

| | | | |
|---|---|---|---|
| WO | WO-2019099661 A1 * | 5/2019 | ............. H04L 5/005 |
| WO | 2020201885 | 10/2020 | |
| WO | 2020205652 | 10/2020 | |

* cited by examiner

FIG.1

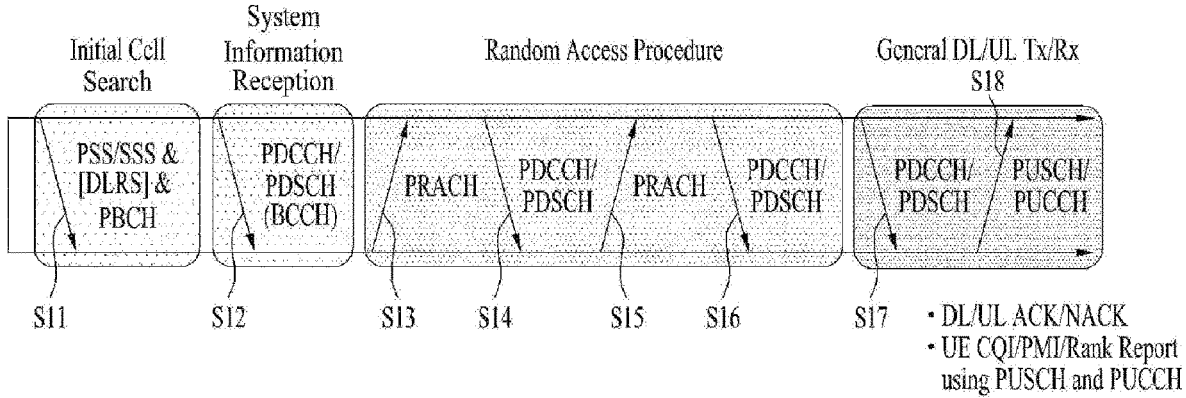

Initial Cell Search

System Information Reception

Random Access Procedure

General DL/UL Tx/Rx S18

| PSS/SSS & [DLRS] & PBCH | PDCCH/ PDSCH (BCCH) | PRACH | PDCCH/ PDSCH | PRACH | PDCCH/ PDSCH | PDCCH/ PDSCH | PUSCH/ PUCCH |

S11    S12    S13   S14   S15   S16    S17

• DL/UL ACK/NACK
• UE CQI/PMI/Rank Report using PUSCH and PUCCH

FIG.2

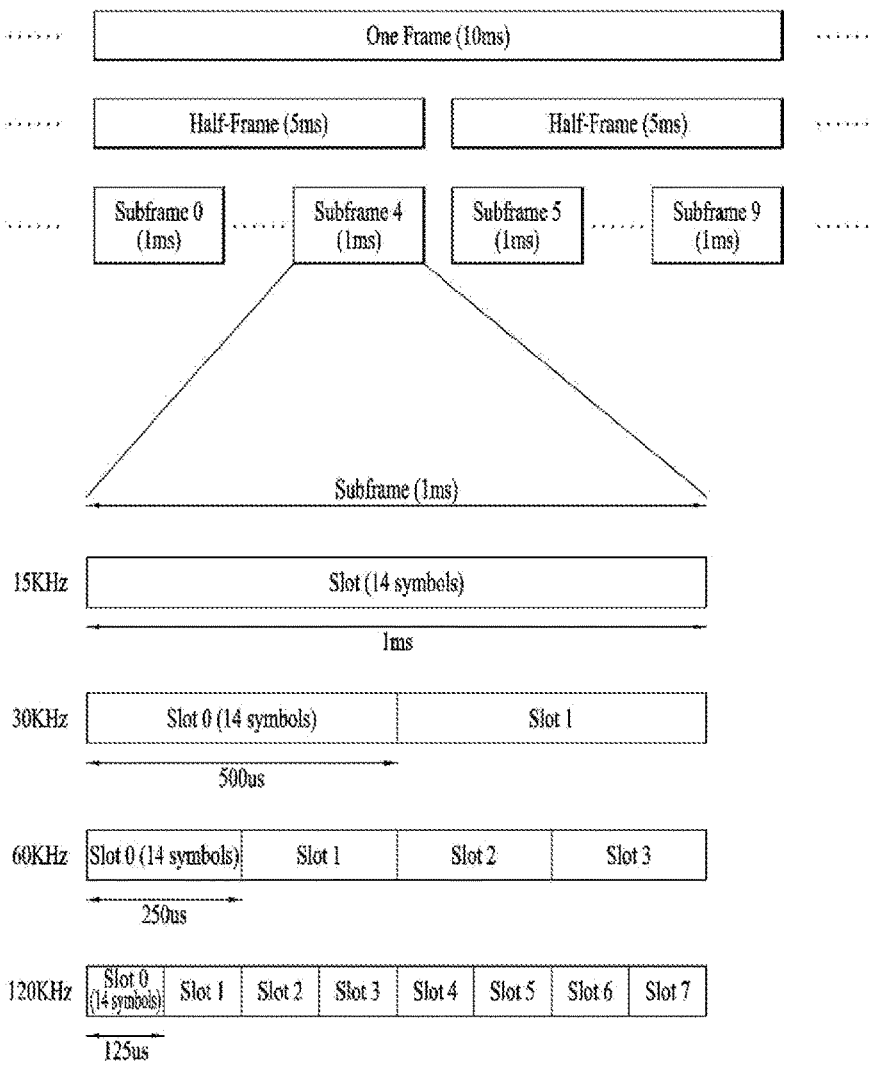

One Frame (10ms)

Half-Frame (5ms)    Half-Frame (5ms)

Subframe 0 (1ms)    Subframe 4 (1ms)    Subframe 5 (1ms)    Subframe 9 (1ms)

Subframe (1ms)

15KHz    Slot (14 symbols)
1ms

30KHz    Slot 0 (14 symbols)    Slot 1
500us

60KHz    Slot 0 (14 symbols)    Slot 1    Slot 2    Slot 3
250us

120KHz    Slot 0 (14 symbols)    Slot 1    Slot 2    Slot 3    Slot 4    Slot 5    Slot 6    Slot 7
125us Non - interleaved CCE - to - REG mapping

FIG.7
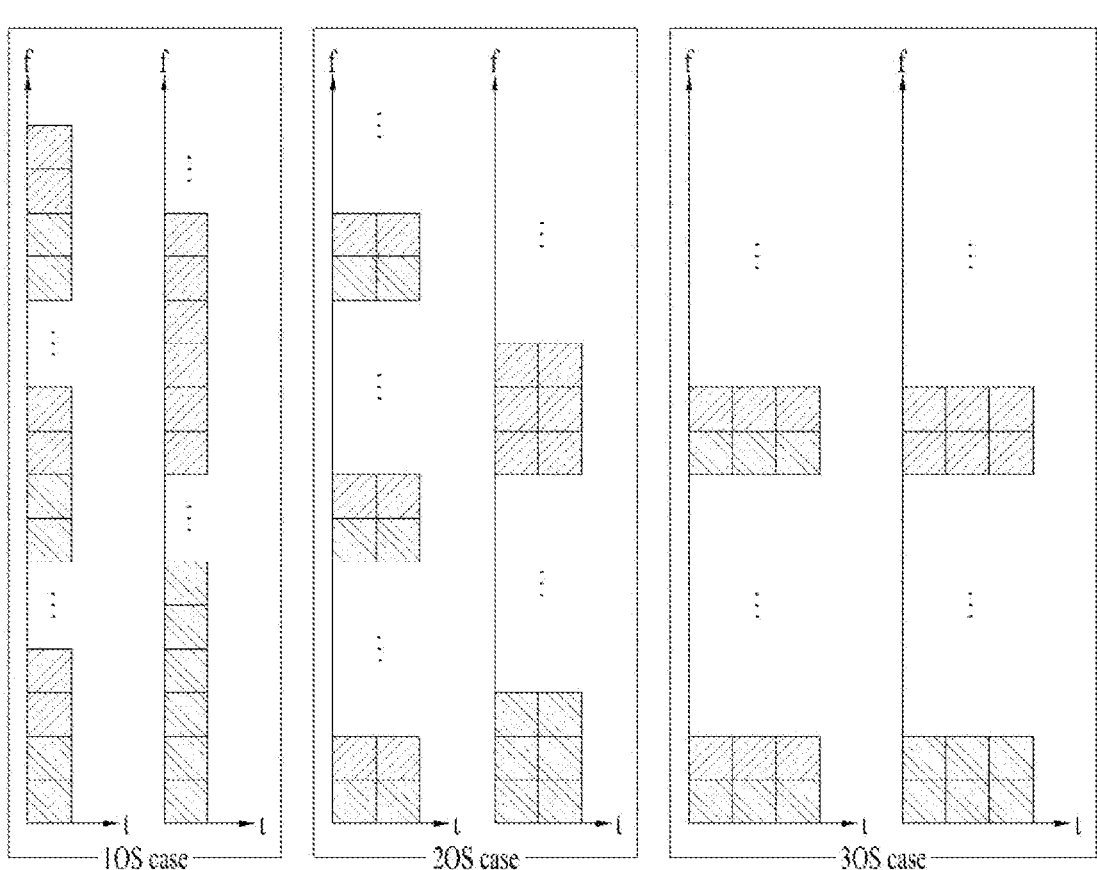
FIG.8
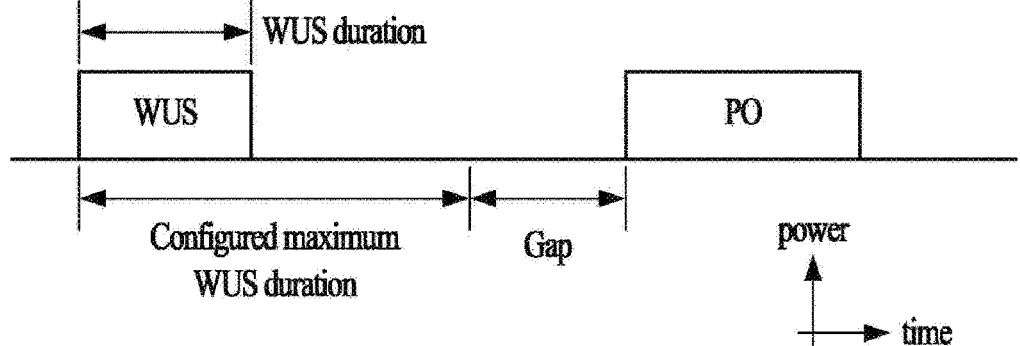

FIG. 12

Device(100, 200)

METHOD AND APPARATUS FOR TRANSMITTING AND RECEIVING WIRELESS SIGNAL IN WIRELESS COMMUNICATION SYSTEM

This application is the National Stage filing under 35 U.S.C. 371 of International Application No. PCT/KR2021/014717 filed on Oct. 20, 2021, which claims priority to Korean Patent Application No. 10-2020-0138137 filed on Oct. 23, 2020, the contents of which are all hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of receiving a signal by a user equipment (UE) in a wireless communication system, including detecting first downlink control information (DCI) for a paging early indicator (PEI); monitoring, based on detection of the first DCI, second DCI for paging on a paging occasion (PO) of a first slot related to the PEI; and receiving a paging message through a physical downlink shared channel (PDSCH) scheduled by the second DCI. The UE may determine, before monitoring the second DCI on the PO, based on the first DCI for the PEI, whether the second DCI is configured to schedule the PDSCH in the first slot based on same-slot scheduling or configured to schedule the PDSCH in a second slot different from the first slot based on cross-slot scheduling.

The first DCI for the PEI may include at least one bit related to whether the second DCI is configured for same-slot scheduling or configured for cross-slot scheduling.

The UE may determine, based on successful detection of the first DCI for the PEI, that the second DCI is configured based on cross-slot scheduling.

The first DCI for the PEI may include a first field related to time domain resource allocation (TDRA) of the PDSCH, and at least one of bit states of the first field may be related to enabling or disabling of cross-slot scheduling.

The UE may belong to a first UE sub-group from among the first UE sub-group supporting cross-slot scheduling and a second UE sub-group not supporting cross-slot scheduling.

The UE may acquire cross-slot scheduling information of the PDSCH through at least one of reserved bits, a time domain resource allocation (TDRA) field, or a cross-slot scheduling (CS) field of the second DCI based on the second DCI being configured for cross-slot scheduling.

The TDRA field may indicate a first slot offset to be applied to the PDSCH, and the CS field may indicate second slot offset information to be additionally applied to the PDSCH to which the first slot offset is applied.

The CS field may indicate any one of a plurality of TDRA tables configured for the UE, and the TDRA field may indicate any one entry in a TDRA table indicated by the CS field.

The UE may be in a radio resource control (RRC) inactive state or an RRC idle state.

According to another aspect of the present disclosure, provided herein is a processor-readable recording medium in which a program for performing the method of receiving a signal is recorded.

According to another aspect of the present disclosure, provided herein is a device for performing the method of receiving a signal. The device may be an application specific integrated circuit (ASIC) or a digital signal processing device. The device may be a user equipment (UE) operating in a 3rd generation partnership project (3GPP) based wireless communication system.

According to another aspect of the present disclosure, provided herein is a method of transmitting a signal by a base station (BS) in a wireless communication system, including transmitting first downlink control information (DCI) for a paging early indicator (PEI) to a user equipment (UE); transmitting second DCI for paging on a paging occasion (PO) of a first slot related to the PEI; and transmitting a paging message through a physical downlink shared channel (PDSCH) scheduled by the second DCI. The BS may inform, before transmission of the second DCI on the PO, through the first DCI for the PEI, the UE of whether the second DCI is configured to schedule the PDSCH in the first slot based on same-slot scheduling or configured to schedule the PDSCH in a second slot different from the first slot based on cross-slot scheduling.

According to another aspect of the present disclosure, provided herein is a device for performing the method of transmitting a signal.

Advantageous Effects

According to an embodiment of the present disclosure, since cross-slot scheduling is used for paging of a UE and whether to use cross-slot scheduling is previously indicated through a paging early indicator (PEI), power and overhead consumed to prepare for paging reception of the UE may be optimized.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

FIG. 1 illustrates physical channels used in a 3rd generation partnership project (3GPP) system as an exemplary wireless communication system, and a general signal transmission method using the same.

FIG. 2 illustrates a radio frame structure.

FIG. 7 illustrates an exemplary physical uplink shared channel (PUSCH) transmission process.

FIG. 8 illustrates an LTE-based wake-up signal.

FIG. 12 illustrates a flow of a signal transmission/reception method according to an example of the present disclosure.

BEST MODE

Figure 3:
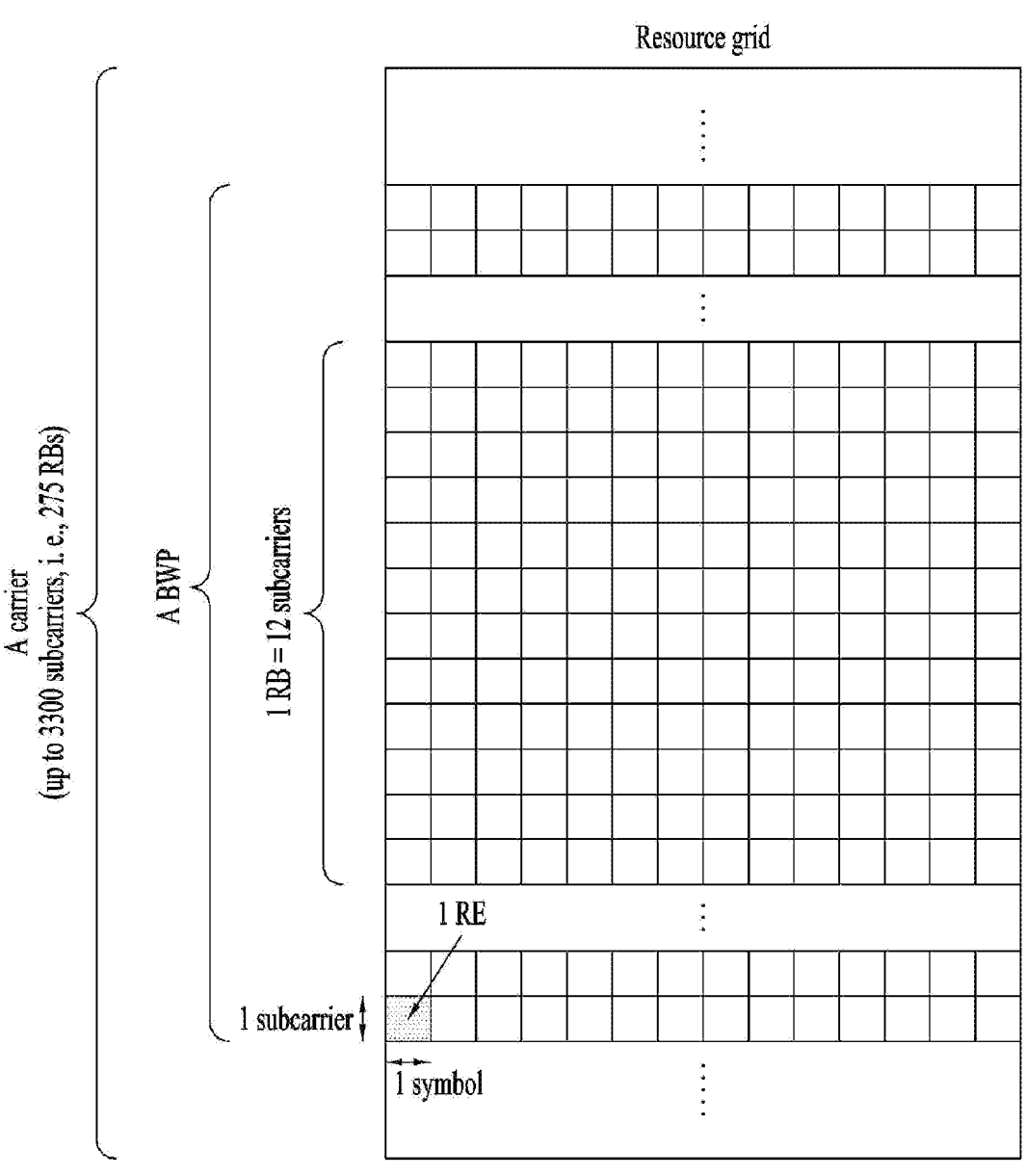
FIG. 3 illustrates a resource grid of a slot.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification
TS 37.213: Introduction of channel access procedures to unlicensed spectrum for NR-based access

Terms and Abbreviations

PSS: Primary Synchronization Signal
SSS: Secondary Synchronization Signal
CRS: Cell reference signal
CSI-RS: Channel State Information Reference Signal
TRS: Tracking Reference Signal
SS: Search Space
CSS: Common Search Space
USS: UE-specific Search Space
PDCCH: Physical Downlink Control Channel; The PDCCH is used to represent PDCCHs of various structures which may be used for the same purpose in the following description.
DCI: Downlink Control Information
WUS: Wake Up Signal; The WUS may be used to represent other method signals or channels (e.g., a paging early indication (PEI)), which perform a similar function.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
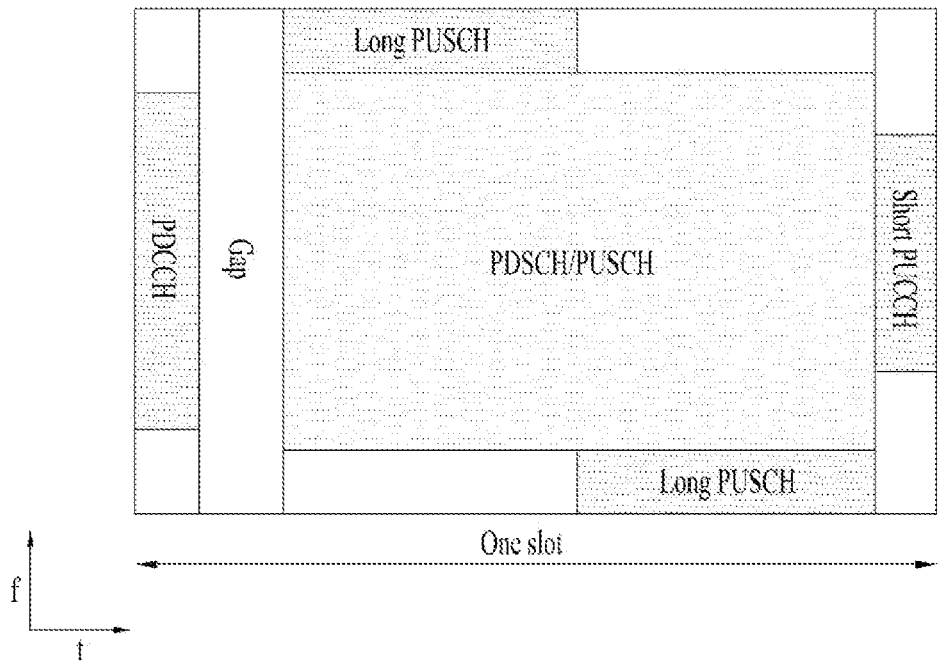
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of config-ured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system infor-mation (e.g., a system information block (SIB)), the CRC is masked by a system information RNTI (SI-RNTI). When the PDCCH is for an RAR, the CRC is masked by a random access-RNTI (RA-RNTI).

Figure 5:
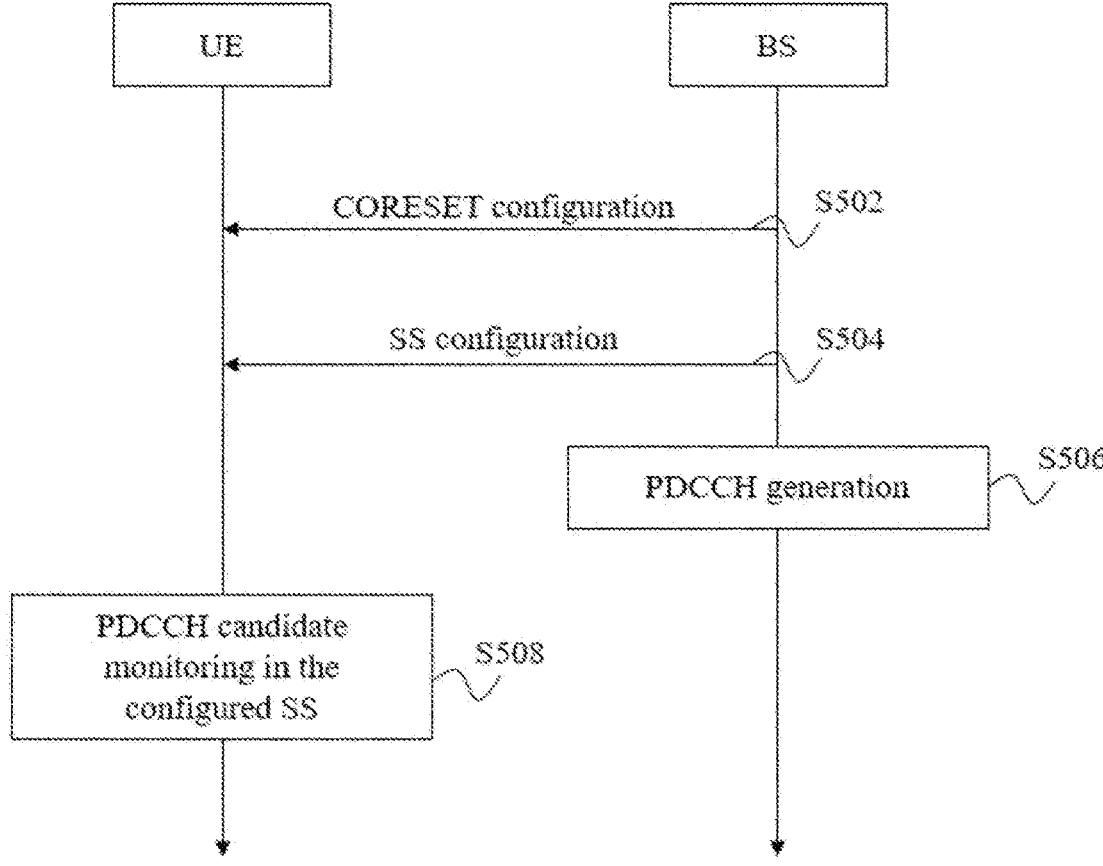
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master informa-tion block (MIB)) or higher-layer signaling (e.g., radio resource control (RRC) signaling). For example, configura-tion information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. Further, configu-ration information about CORESET #N (e.g., N>0) may be transmitted by RRC signaling (e.g., cell-common RRC signaling, UE-specific RRC signaling, or the like). For example, the UE-specific RRC signaling carrying CORE-SET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequencyDomainResources: Indicates the frequency-do-main resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The dura-tion has a value between 1 and 3.

cce-REG-MappingType: Indicates a control channel ele-ment (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization. When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission con-figuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configu-ration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of descrip-tion, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.

controlResourceSetId: Indicates a CORESET associated with the SS.

monitoringSlotPeriodicityAndOffset: Indicates a period-icity (in slots) and offset (in slots) for PDCCH moni-toring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candi-dates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
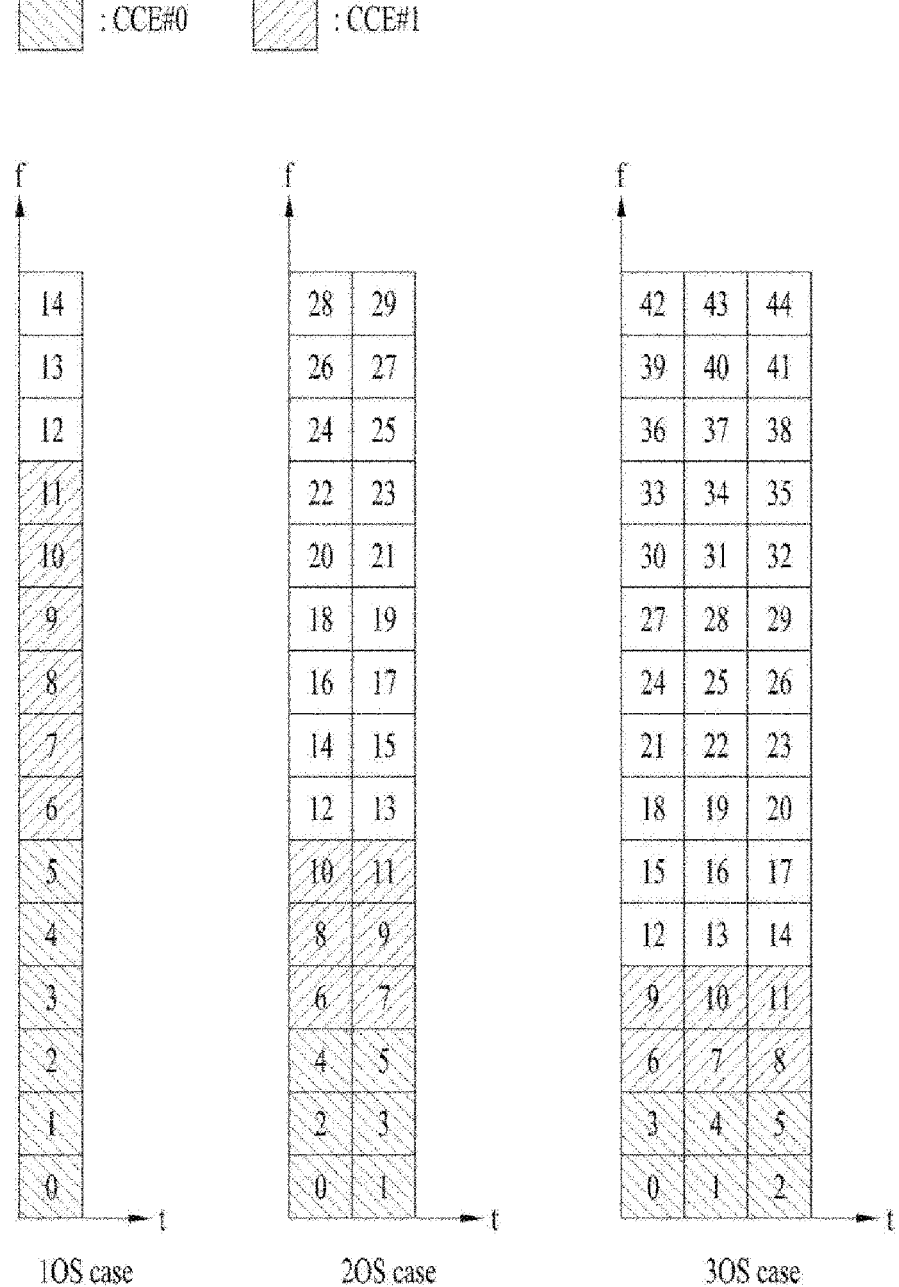
FIG. 6 illustrates an exemplary PDSCH reception and acknowledgment/negative acknowledgment (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 6 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.
2) In the case of CN-initiated paging, a UE-specific cycle is configured by NAS signaling.
3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each PO signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner

An SFN for the PF is determined by:

$$(SFN+PF\_offset) \bmod T = (T \text{ div } N)*(UE\_ID \bmod N)$$

An index i_s indicating the index of the PO is determined by:

$$i\_s = floor(UE\_ID/N) \bmod Ns$$

The following parameters may be used to calculate the PF and i_s above.

T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).

N: Number of total paging frames in T

Ns: Number of POs for a PF

PF_offset: Offset used for PF determination

UE_ID: 5G-S-TMSI mod 1024

WUS (Wake-Up Signal)/PEI (Paging Early Indication)

In LTE Rel-15 NB-IoT and MTC, a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup probability of a UE by using a WUS transmission position and sequence determined based on the UE-group ID of the UE. FIG. 8 is a diagram illustrating a WUS in an LTE system. Referring to FIG. 8, in MTC and NB-IoT, the WUS may be used to reduce power consumption related to paging monitoring. The WUS is a physical layer signal indicating whether a UE is supposed to monitor a paging signal (e.g., an MPDCCH/NPDCCH scrambled with a P-RNTI) according to a cell configuration. For a UE which is not configured with eDRX (i.e., configured only with DRX), the WUS may be associated with one PO (N=1). On the contrary, for a UE configured with eDRX, the WUS may be associated with one or more POs (N>1). Upon detection of the WUS, the UE may monitor N POs after being associated with the WUS. When failing to detect the WUS, the UE may maintain sleep mode by skipping PO monitoring until the next WUS monitoring. The UE may receive WUS configuration information from the BS and monitor the WUS based on the WUS configuration information. The WUS configuration information may include, for example, a maximum WUS duration, the number of consecutive POs associated with the WUS, and gap information. The maximum WUS duration may refer to a maximum time period during which the WUS may be transmitted, and may be expressed as a ratio to a maximum repetition number (e.g., Rmax) related to a PDCCH (e.g., MPDCCH or NPDCCH). Although the UE may expect repeated WUS transmissions within the maximum WUS duration, the number of actual WUS transmissions may be less than a maximum number of WUS transmissions within the maximum WUS duration. For example, the number of WUS repetitions may be small for a UE in good coverage. A resource/occasion in which the WUS may be transmitted within the maximum WUS duration is referred to as a WUS resource. The WUS resource may be defined as a plurality of consecutive OFDM symbols by a plurality of consecutive subcarriers. The WUS resource may be defined as a plurality of consecutive OFDM symbols by a plurality of consecutive subcarriers in a subframe or slot. For example, the WUS resource may be defined as 14 consecutive OFDM symbols by 12 consecutive subcarriers. Upon detection of the WUS, the UE does not monitor the WUS until a first PO associated with the WUS. When the WUS is not detected during the maximum WUS duration, the UE does not monitor a paging signal in POs associated with the WUS (or the UE remains in the sleep mode).

Even in a communication system such as NR, whether the UE needs to monitor paging DCI in a PO or whether the paging DCI is provided may be indicated through a PEI (e.g., PEI based on a sequence or DCI). Upon succeeding in detecting the PEI, the UE monitors the paging DCI (and/or a PDSCH carrying a corresponding paging message). Upon failing to detect the PEI, the UE may skip monitoring of the paging DCI in the PO.

Cross Transmission Time Interval (TTI) Scheduling for Paging

In communication systems such as LTE and NR, transmission positions of time/frequency domain resources for data channels (e.g., a PUSCH and a PDSCH) may be dynamically scheduled using DCI. In this case, as one method of determining/indicating a transmission timing of the PDSCH/PUSCH, position information of the time domain resource of the PDSCH/PUSCH calculated/indicated based on a transmission/reception timing of a PDCCH, which is a DL control channel through which the DCI is transmitted, may be used (e.g., a time domain resource allocation (TDRA) field of the DCI). For example, in the NR standard, a gap (e.g., a slot offset) having the size of one or more slots may be configured between PDCCH transmission/reception and transmission start of the PDSCH/PUSCH scheduled through PDCCH transmission/reception, and information related to the gap (e.g., slot offset) may be indicated by the BS.

Thus, after the transmission/reception timing (e.g., slot #n) of the PDCCH, a scheduling type in which PDSCH/PUSCH transmission (e.g., slot #m) scheduled by the PDCCH is configured (e.g., n<m) in time resources (slots) of different TTIs is called cross TTI scheduling. Hereinafter, although a description of cross-slot scheduling will be given as an example of cross TTI scheduling, the present disclosure is not limited to a slot unit, and cross scheduling based on time resources of various units or on TTIs of various sizes may be used.

When cross-slot scheduling is applied, the UE may not perform preparation and operation for PDSCH decoding or PUSCH transmission (which may be scheduled within the same slot) from a PDCCH decoding timing. However, even when the PDCCH is transmitted, the case in which there is no actual PDSCH/PUSCH scheduling by the PDCCH may exist. In this case, cross-slot scheduling may be advantageous in that unnecessary power consumption of the UE (e.g., power consumed in preparation for PUSCH/PDSCH transmission/reception) is reduced.

As a more specific example, a minimum value (e.g., minimum processing time) that may be scheduled/indicated as a PDCCH-to-PDSCH/PUSCH gap may be defined/configured. Accordingly, the UE may perform decoding of the PDCCH on the assumption that the PDCCH to be decoded does not schedule the PDSCH/PUSCH having a slot offset smaller than the minimum processing time. Accordingly, the UE does not need to prepare for PDSCH/PUSCH transmission/reception earlier than a time guaranteed through the minimum processing time or does not need to perform PDCCH decoding earlier than the time guaranteed through the minimum processing time. In this way, the guaranteed time based on the minimum processing time and cross-slot scheduling may reduce the burden on the processing speed of the UE. Since power consumed increases as the processing speed of the UE increases, cross-slot scheduling may be advantageous in that unnecessary power consumption of the UE may be reduced as mentioned above.

Currently, in 3GPP, various methods are being discussed to increase the power saving efficiency of the UE aiming for introduction in Rel-17 NR. In particular, in order to increase the power saving efficiency of UEs in an idle/inactive mode state, a power saving technique may need to be introduced in a paging procedure. In the case of paging, a PDCCH for paging (e.g., a PDCCH scrambled with a P-RNTI) is transmitted and received through a CSS monitored by a plurality of UEs, and scheduling information of a PDSCH (e.g., a PDSCH carrying a paging message) may be provided through the PDCCH. In this case, the scheduling information on a time domain resource of the PDSCH may be dynamically signaled through DCI carried by the PDCCH. In this case, the time domain resource of the PDSCH is defined to be indicated based on a (default) TDRA table determined in the standard or on a start and length indicator value (SLIV) configured by a pdsch-ConfigCommon information element (IE) (e.g., a common PDSCH configuration IE) transmitted and received by an SIB.

However, in the current Rel-16 NR standard, a K0 value, which is a slot offset (i.e., a gap between transmission and reception slots of the PDCCH and the PDSCH) applicable to an idle/inactive mode UE, is at most 1, and most K0 values have values of 0 (i.e., same-slot scheduling). Therefore, in the current standard, a PDSCH scheduling type for paging message transmission is not suitable for cross-slot scheduling, and there is a limit in that the UE may not obtain a benefit of power saving according to cross-slot scheduling. In order to obtain, from paging, the benefit of power saving through cross-slot scheduling, a new time domain resource allocation (hereinafter referred to as TDRA) method should be defined.

The CSS used in a paging procedure is designed such that a plurality of UEs may simultaneously monitor the CSS. Therefore, all UEs expecting/monitoring reception of the same PDCCH in the same CSS (e.g., all UEs regardless of standard release or capability supported by a corresponding UE) should support reception of the PDCCH and, when new technology is introduced for the CSS, a backward compatibility issue for fulfilling such a condition should be satisfied. If the paging-related technology introduced in the Rel-17 NR standard does not satisfy backward compatibility, overhead and resource inefficiency may occur (e.g., a problem in which resource efficiency is lowered when a separate resource area is allocated for a UE having a specific release/capability) due to a separate resource configuration for supporting UEs having releases or capabilities different from those of Rel-17. In such a situation, when UEs share a BWP or an SS, a blocking (overlap/collision) issue may occur between the UEs (e.g., occurrence of SS collision at a timing of a common multiple of different SSs according to an SS periodicity). Therefore, backward compatibility needs to be guaranteed/considered even when PDCCH coverage is to be improved/compensated in an SS that needs to be simultaneously monitored by a plurality of UEs regardless of specific conditions, such as a CSS.

According to an embodiment of the present disclosure, a method of applying cross-slot scheduling to transmission and reception of the PDCCH and the PDSCH in the paging procedure is proposed. Proposals described below have the advantage that existing UEs (i.e. UEs to which the proposals are not applied) may continue to perform the same operation as an existing operation even in a CSS designed such that a plurality of UEs mentioned above simultaneously performs monitoring therein and also have the advantage of not generating additional network overhead.

Although transmission in the CSS is assumed hereinbelow, those skilled in the art will understand that the present disclosure is not limited thereto and may be extended to a USS. In the following description, CSS(s) and USS(s) may be extended to and interpreted as CSS set(s) and USS set(s), respectively. An SS may mean at least one of CSS(s) or USS(s).

For example, the proposals described later may be used for scheduling of a PDSCH that transmits a paging message in the communication systems such as LTE and NR. However, the proposals are not limited to the corresponding example and may generally be applied to other scheduling methods that may expect PDSCH transmission and reception unless the spirit of the disclosure is violated.

Figure 9:
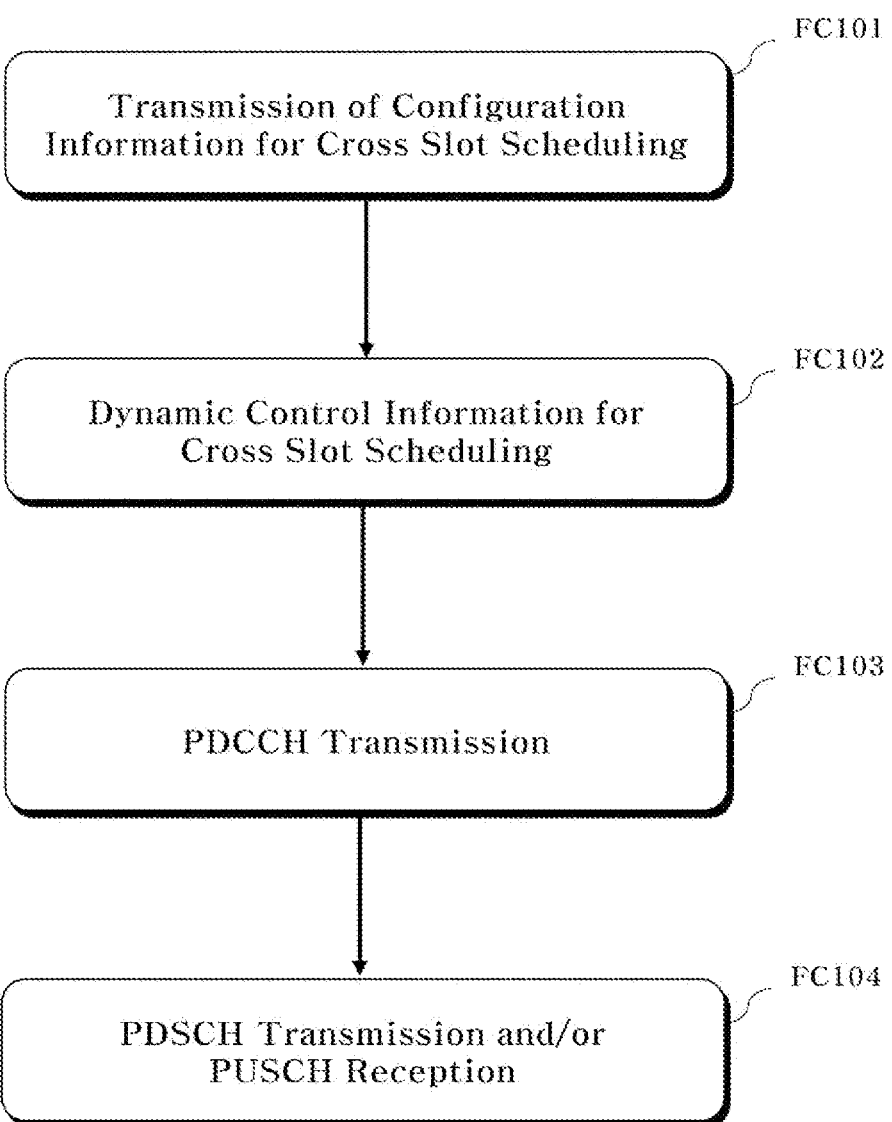
FIG. 9 illustrates a flowchart of the operation of a BS to which a method proposed in the present disclosure is applicable.
Figure 10:
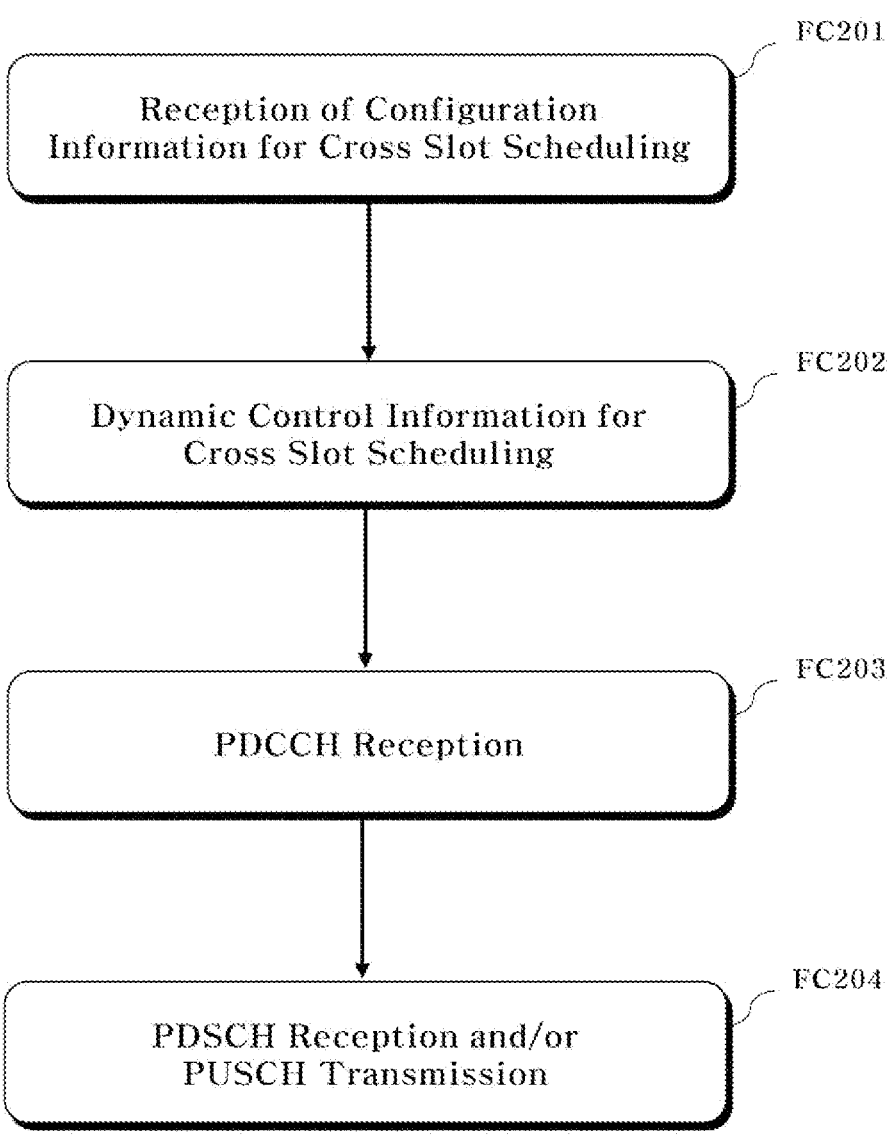
FIG. 10 illustrates a flowchart of the operation of a UE to which a method proposed in the present disclosure is applicable.

FIGS. 9 and 10 illustrate the operation of a BS and the operation of a UE according to an embodiment of the present disclosure, respectively.

Referring to FIG. 9, the BS may generate and transmit configuration information related to cross-slot scheduling in order to support the operation proposed in the present disclosure (FC101). For example, the configuration information may be transmitted using higher layer signaling (e.g., an SIB or RRC signaling).

When there is DL data that the BS is to transmit and when the BS desires to transmit the DL data through a PDSCH to which cross-slot scheduling is applied, the BS may transmit dynamic control information for cross-slot scheduling based on the configuration information transmitted in FC101 (FC102). For example, the dynamic control information may be transmitted in the form of a PDCCH or a DL signal. If a separate signal/channel that dynamically controls configuration related to cross-slot scheduling is not present, step FC102 may be omitted.

Thereafter, the BS may generate scheduling information for the PDSCH for transmitting the DL data based on the configuration information and transmit the scheduling information through the PDCCH (FC103).

Next, the BS may perform PDSCH transmission (or PUSCH reception) based on the scheduling information for the PDSCH (or PUSCH) transmitted through the PDCCH (FC104).

Referring to FIG. 10, upon receiving the configuration information related to cross-slot scheduling from the BS, the UE may expect that the operation proposed in this disclosure will be supported (FC201). For example, configuration information may be received using higher layer signaling (e.g., an SIB or RRC signaling).

The UE may receive the dynamic control information for cross-slot scheduling based on the configuration information (FC202). For example, the dynamic control information may be received in the form of the PDCCH or the DL signal. If a separate signal/channel that dynamically controls the configuration related to cross-slot scheduling is not present, FC202 may be omitted.

Next, the UE may monitor the PDCCH and receive the PDCCH transmitted by the BS (FC203).

Upon succeeding in receiving the PDCCH and decoding DCI, the UE may perform PDSCH reception/PUSCH transmission based on the configuration information and on scheduled information included in the DCI (FC204). For example, the UE may perform PUSCH transmission based on UL grant DCI. If the UE fails to decode the DCI or the UE succeeds in decoding the DCI but determines that there is no scheduled information for the UE, PDSCH reception/

PUSCH transmission may be omitted. If another channel is scheduled by the DCI, the operation of PDSCH reception/ PUSCH transmission may be replaced with transmission/ reception of the other channel One or more of methods below may be implemented in combination or each method may be implemented independently. Some terms, symbols, and orders used to describe the disclosure may be replaced with other terms, symbols, and orders as long as the principle of the disclosure is maintained.

Hereinbelow, while PDSCH scheduling for a paging message will be exemplified, proposals of the present disclosure are not limited to a specific type of a physical channel or a specific purpose of information delivered therethrough unless otherwise specified. Therefore, the proposals of the present disclosure may be applied to all types of physical channels and purposes of information transmitted therethrough, unless the principle of the present disclosure is violated even though an additional description is not given.

In addition, a description of the NR system will be given by way of example, the proposals of the present disclosure are not limited to NR transmission and reception. The proposals of the present disclosure may be applied to all wireless communication transmission and reception structures unless the principle of the disclosure is violated, even though there is no separate description.

The following terms are explained based on definitions. The terms defined below are for convenience of description, and the application of the present disclosure is not limited to the term definitions below.

Cap-L UE: A UE to which the Proposal(s) described below are not applied, which means a UE for which a separate operation for cross-slot scheduling is not defined. In order to explain the case in which the proposals are applied to a paging procedure, a UE to which paging PDSCH scheduling in the Rel-16 NR standard and in previous releases is applied is exemplified as the Cap-L UE, but the present disclosure is not limited thereto.

Cap-P UE: A UE with a capability to which the proposal(s) described below are applied, which means a UE for which a separate operation for cross-slot scheduling is defined. However, the capability of the Cap-P UE to receive a PDSCH to which cross-slot scheduling is not applied is not limited. In order to explain the case in which proposals are applied to the paging procedure, a UE capable of performing cross-slot scheduling of a paging PDSCH is exemplified as the Cap-P UE, but the present disclosure is not limited thereto.

PDSCH-L: A PDSCH to which the proposal(s) described below are not applied, which means a PDSCH to which a separate operation for cross-slot scheduling is not applied. In order to explain the case in which proposals are applied to the paging procedure, the paging PDSCH applied to the Rel-16 NR standard and previous releases is exemplified as the PDSCH-L, but the present disclosure is not limited thereto.

PDSCH-P: A PDSCH to which the proposal(s) described below are applied, which means a PDSCH to which a separate operation for cross-slot scheduling is applied. However, the PDSCH-P may include the case in which cross-slot scheduling is not applied depending on a specific method and situation, and the present disclosure does not exclude such a case. In order to explain the case in which proposals are applied to the paging procedure, a paging PDSCH capable of performing cross-slot scheduling is exemplified as the PDSCH-P, but the present disclosure is not limited thereto.

(Proposal 1) Cross-Slot Scheduling Operation Using PEI

As described above, a PEI may refer to a signal or a channel (or information/fields transmitted/received through the corresponding signal/channel) used for the purpose for which a network (e.g., at least a BS) indicates whether paging DCI and/or a paging message is transmitted or indicates whether the paging DCI or the paging message is received by specific UE(s), prior to a PO (e.g., resource(s) to which a paging signal may be mapped). When a paging procedure to which the PEI is applied is used, the UE may acquire at least a part of information related to scheduling of the paging DCI and the paging message prior to the PO through the PEI. Proposal 1 proposes a method of transmitting and receiving, through the PEI, information related to cross-slot scheduling, which may be applied to procedures of monitoring the paging DCI and transmitting and receiving the paging message, using such a feature.

When cross-slot scheduling is applied, since the UE does not expect that a PDSCH will be decoded in the same slot as an SS monitoring timing, the UE need not perform an operation to prepare for decoding in advance. Therethrough, a power saving effect may be obtained. If the BS desires to dynamically control cross-slot scheduling, the UE should be aware in advance of whether or not cross-slot scheduling is applied to perform an operation advantageous to power saving. If the PEI is provided prior to a PO and if a time gap between the PEI and the PO is guaranteed until the UE decodes the PEI and prepares for an operation in the PO, the UE may acquire a power saving effect by obtaining cross-slot scheduling related information using the PEI.

Figure 11:
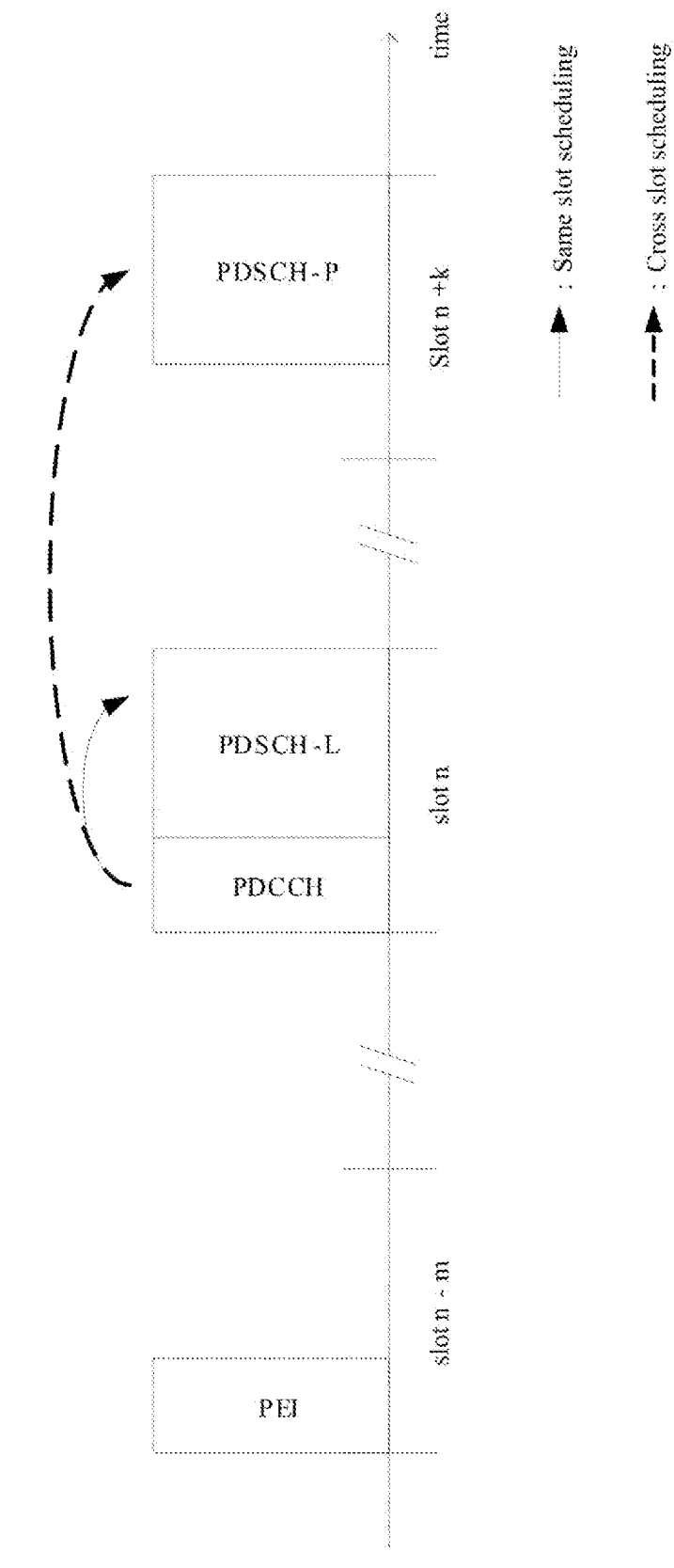
FIG. 11 illustrates same-slot scheduling and cross-slot scheduling according to an embodiment of the present disclosure.

FIG. 11 schematically illustrates an example of relative positions at which a PEI, a PDCCH, and a PDSCH-L (or a PDSCH-P), which are associated with each other, are transmitted and received in the time domain.

Cross-slot scheduling information provided using a PEI may be configured/defined to be applied only to PO(s) associated with the PEI. This serves to cause the BS to dynamically control an operation related to cross-slot scheduling and, at the same time, prevent information inconsistency from being accumulated even when the UE misses the PEI including information related to cross-slot scheduling.

On the other hand, since the Cap-L UE does not perform a PEI detection operation, PEI transmission does not affect the Cap-L UE. For example, the Cap-L UE may be asleep in an idle/inactive state at a PEI transmission timing. In addition, even if the Cap-L UE detects a monitoring PDCCH in a corresponding PO, the Cap-L UE may not wake up unless a PDSCH-L is transmitted. Therefore, whether or not the BS transmits a PDSCH-P does not affect the operation of the Cap-L UE. Thus, PEI-based methods (e.g., Proposals 1-x and 2-x) have the advantage of not causing a backward compatibility problem while minimizing impact on a legacy method.

(Proposal 1-1) Cross-Slot Scheduling Indication Due to PEI Detection

According to Proposal 1-1, upon receiving a PEI, the UE expects that cross-slot scheduling will be applied at the position of a PO associated with the received PEI. Proposal 1-1 has the advantage of maintaining the decoding or detection performance of the PEI because a field or sequence for configuring separate information is not added to the PEI while indicating whether cross-slot scheduling is applied.

For example, PEI detection may indicate cross-slot scheduling, and the PEI may be configured so as not to include additional information/fields/sequences other than cross-slot scheduling. As an example of operation of the Cap-P UE in this case, the Cap-P UE may assume that a PDCCH of a corresponding PO will be configured for cross-slot scheduling if the Cap-P UE has detected the PEI. Since the Cap-P UE does not need to additionally decode the detected PEI or perform bit-level processing, additional power consumption due to PEI detection may be minimized.

PEI-Related Operation of UE Based on Proposal 1-1

Upon receiving the PEI, the Cap-P UE may be configured/defined to expect that cross-slot scheduling will be applied at the position of a PO corresponding to reception of the PEI. To this end, when transmitting the PEI, the BS may be configured/defined to transmit a PDSCH-P to which cross-slot scheduling is applied for Cap-P UEs that monitor the PEI. In this case, if the PEI has been transmitted but transmission of a paging message for the corresponding Cap-P UE is not required, the BS may omit transmission of the PDSCH-P. Alternatively, when transmission of the paging message for the corresponding Cap-P UE is not required, the BS may exclude paging information about the corresponding Cap-P UE from at least the PDSCH-P.

(Proposal 1-2) PEI that Explicitly Includes Information Related to Cross-Slot Scheduling Proposal 1-2 proposes a method of explicitly providing information related to cross-slot scheduling through the PEI. Proposal 1-2 has the advantage that the BS supports an existing operation related to the PEI and has scheduling flexibility regarding whether cross-slot scheduling is applied.

Example of Notifying Whether Cross-Slot Scheduling is Applied Using DCI (e.g., 1-Bit Field)

For example, the PEI may be provided in a DCI format. If Proposal 1-2 is applied to a DCI-based PEI, a bit (e.g., 1 bit) indicating whether cross-slot scheduling is applied may be included in the PEI. For example, when a 1-bit indicator of the PEI indicates that cross-slot scheduling is enabled, the UE may expect that cross-slot scheduling will be applied at the position of a PO corresponding to reception of the PEI and, when the 1-bit indicator of the PEI indicates that cross-slot scheduling is disabled, the UE may not expect that cross-slot scheduling will be applied at the position of the PO corresponding to reception of the PEI. Since the PEI, which indicates whether cross-slot scheduling is applied, is configured compactly, overhead increase of DCI due to the PEI may be minimized.

Example of Indicating Part of Information Related to TDRA Using m(>1)-Bit Field of DCI If Proposal 1-2 is applied to the DCI-based PEI, an m-bit field for indicating some information related to TDRA may be included in the PEI. In this case, some information related to TDRA may include parameter information related to cross-slot scheduling. In this case, one or more of states represented by m bits may indicate that cross-slot scheduling is enabled. When a plurality of states is used to indicate that cross-slot scheduling is enabled, each state may correspond to a different TDRA-related parameter. If one of the states is indicated by the PEI, the UE may be configured/defined to expect that cross-slot scheduling will be applied based on the TDRA-related parameter indicated at the position of the PO corresponding to reception of the PEI. In addition, one state of the m bits may be used for the purpose of indicating that cross-slot scheduling is disabled. If the corresponding state is designated by the PEI, the UE may be configured/defined not to expect that cross-slot scheduling is applied at the position of the PO corresponding to reception of the PEI. In this case, since the type of cross-slot scheduling that the BS desires to support may be dynamically controlled, scheduling flexibility of the BS for a transmission position of the PDSCH-P may be increased.

PEI-Related Operation of UE Based on Proposal 1-2

Upon confirming that cross-slot scheduling is enabled through information included in a received PEI, the Cap-P UE may be configured/defined to expect that cross-slot scheduling will be applied at the position of a PO associated with the PEI. In this case, if some information related to TDRA is included in the PEI, the UE may expect that cross-slot scheduling will be applied based on some information related to TDRA. Conversely, upon confirming that cross-slot scheduling is disabled through the information included in the received PEI, the Cap-P UE may be configured/defined to expect that cross-slot scheduling will not be applied at the position of the PO related to the PEI.

To this end, upon transmitting the PEI, the BS may indicate through the PEI whether to transmit a PDSCH-P to which cross-slot scheduling is applied. If some information related to TDRA is capable of being included in the PEI, the BS may determine the related information together and provide the information. In addition, the BS may be configured/defined to transmit a PDSCH based on information transmitted through the PEI at the position of the PO associated with the PEI.

For example, when the PEI includes at least some information related to TDRA of the PDSCH, information already indicated to the Cap-P UE through the PEI may be omitted from a PDCCH of the corresponding PO. Overhead increase of the PDCCH of the PO may be minimized. In addition, legacy impact on a field configuration of DCI included in the PDCCH of the PO may be minimized (Proposal 1-3) Different Determination of Cross-Slot Scheduling Information According to Reception of PEI Depending on Characteristics of UE Proposal 1-3 proposes a method of differently interpreting information depending on characteristics of the UE when information related to cross-slot scheduling is provided through the PEI. Proposal 1-3 may be advantageous in scheduling an appropriate PDSCH in consideration of the case in which the PEI supports various power saving modes and requirements for cross-slot scheduling are different between UEs that monitor the PEI.

UE Sub-Grouping for Cross-Slot Scheduling Based on Proposal 1-3

For example, a network (at least one BS) may divide a plurality of UEs that monitors the same PO into one or multiple sub-groups. The PEI may be provided to each sub-group. For example, the PEI may distinguishably indicate a transmission possibility of a paging message for each sub-group. The PEI may be used to support the sub-grouping operation of the UE. Similarly, as a criterion for dividing UE sub-groups, characteristics of cross-slot scheduling of the UE may be considered. In this case, UE sub-groups may be divided into a sub-group (hereinafter sub-group-A) for UEs capable of performing cross-slot scheduling and a sub-group (hereinafter sub-group-B) for UEs incapable of performing cross-slot scheduling. UEs belonging to sub-group-B may be defined always not to expect cross-slot scheduling regardless of whether the PEI is received or not. For example, even when a specific Cap-P UE receives the PEI, if the UE belongs to sub-group-B, the specific Cap-P UE may not expect cross-slot scheduling. Such a sub-group-B configuration method may be advantageous to always disable cross-slot scheduling when a UE does not expect power saving gain using cross-slot scheduling or requires low latency for paging.

PEI-Related Operation of UE Based on Proposal 1-3

If Proposal 1-1 and Proposal 1-3 are applied together, when a UE belonging to sub-group-A receives the PEI, the UE may be configured/defined to apply cross-slot scheduling according to the method proposed in Proposal 1-1.

If Proposal 1-2 and Proposal 1-3 are applied together, when the UE belonging to sub-group-A receives the PEI, the UE may be configured/defined to apply cross-slot scheduling according to the method proposed in Proposal 1-2.

(Proposal 1-4) Cross-Slot Scheduling Related Operation of UE that Fails to Receive PEI In a situation in which information related to cross-slot scheduling is provided using the PEI, such as Proposal 1-1 and Proposal 1-2, the case in which the UE fails to receive the PEI (i.e., fails to detect the PEI) may exist. The case in which the UE fails to receive the PEI may include 1) the case in which the BS has not transmitted the PEI, or 2) the case in which the BS has transmitted the PEI but the UE fails to detect the PEI (hereinafter referred to as a PEI missing case). In this way, when the UE fails to receive the PEI, whether to monitor a PO related/corresponding to the unreceived PEI may be defined by standards or indicated by network signaling (e.g., an SIB). In Proposal 1-3, when the operation of the UE is defined to monitor the PO related/corresponding to the unreceived PEI even if the UE fails to detect the PEI (fails to receive the PEI), a cross-slot scheduling related operation that the UE may expect is proposed.

Method of Determining that UE that Fails to Receive PEI does not Expect Cross-Slot Scheduling Upon failing to receive the PEI, the Cap-P UE may be configured/defined so as not to expect that cross-slot scheduling will be applied at the position of a PO corresponding to the reception of the corresponding PEI. For example, when the Cap-P UE fails to receive the PEI, the UE may not expect to receive a PDCCH that schedules a PDSCH-P at the position of the PO corresponding to reception of the PEI. For example, even if the Cap-P UE fails to receive the PEI, the UE may attempt to detect the PDCCH that schedules a PDSCH-L at the position of the PO corresponding to reception of the PEI. This may be advantageous for the BS to ensure scheduling flexibility regarding whether cross-slot scheduling is applied depending on whether the PEI is transmitted or not. In particular, when Proposal 1-1 and Proposal 1-4 are applied together, a method of omitting PEI transmission may have an advantageous effect in that the method may be used as a method for disabling cross-slot scheduling.

As another example, if the Cap-P UE fails to receive the PEI, the UE may also omit an attempt to detect the PDCCH that schedules the PDSCH-L at the position of the PO corresponding to reception of the PEI.

Method of Determining Operation by BS when UE Fails to Receive PEI

When the Cap-P UE fails to receive the PEI, the UE may be configured/defined to expect that cross-slot scheduling will be or will not be applied at the position of the PO corresponding to reception of the PEI based on information provided by the BS. For example, the information provided by the BS may be transmitted through higher layer signaling such as an SIB and may be included as a lower element in configuration information related to the PEI. This is advantageous in terms of providing scheduling flexibility for cross-slot scheduling of the BS.

(Proposal 2) Cross-Slot Scheduling Operation Using Paging DCI

The cross-slot scheduling method based on dynamic signaling of the BS increases the flexibility of a network operation of the BS, while resource overhead for dynamic signaling may increase. In addition, the BS may not support the PEI according to needs and network situations, and even if the PEI is supported, the BS may not separately provide information related to cross-slot scheduling. Considering this, Proposal 2 proposes a method for a UE that monitors paging DCI (e.g., DCI for scheduling a paging message or a DCI format for the paging message) to transmit and receive information related to cross-slot scheduling (without separate dynamic scheduling other than the paging DCI) and to apply the information related to cross-slot scheduling.

As a specific situation related to Proposal 2, a type in which the UE acquires information as to whether cross-slot scheduling for paging is applied through semi-static information transmitted by the BS and applies cross-slot scheduling may be considered. In this case, the UE may be configured/defined to continuously maintain the acquired cross-slot scheduling information until the case in which the acquired semi-static information is no longer valid occurs (e.g., the case in which the UE acquires new semi-static information or moves from a cell).

Meanwhile, among the operations of the UE/BS related to the PEI of Proposal 1 described above, those that do not conflict with the paging DCI-related operation of Proposal 2 may also be applied to the paging DCI of Proposal 2. For example, the operation of the UE that receives/fails to receive the PEI may be alternatively interpreted as the operation of the UE that acquires/fails to acquire information related to cross-slot scheduling in the paging DCI, and the present disclosure is not limited thereto.

(Proposal 2-1) Provision of Information Related to Cross-Slot Scheduling Using Reserved Bit(s) of Paging DCI Proposal 2-1 proposes a method of transmitting and receiving, through paging DCI, information related to cross-slot scheduling for a PDSCH scheduled through the paging DCI. As a specific example, in DCI format 1_0 in which a CRC is scrambled with a P-RNTI based on the Rel-16 NR standard, the information related to cross-slot scheduling may be provided using a part of reserved bits. This has the advantage in that related information may be provided to the Cap-P UE supporting cross-slot scheduling, without affecting the Cap-L UE that does not support cross-slot scheduling, using the same DCI. A cross-slot scheduling (CS)_field described below may mean reserved bit(s) providing the information related to cross-slot scheduling. The method proposed in Proposal 2-1 may also be applied when other reserved bits are used and. For example, the method may be applied to reserved bits of a short message field.

Information Included in CS Field

As a specific example to which Proposal 2-1 is applied, the information provided through CS_field may be used as an index for selecting a TDRA table. To this end, one or more TDRA tables may be defined/configured to support cross-slot scheduling of paging. If one or multiple of separate pdsch-TimeDomainAllocationList for cross-slot scheduling (hereinafter referred to as pdsch-TimeDomainAllocationList-P) are provided by pdsch-ConfigCommon included in an SIB, the index for selecting the aforementioned TDRA table may be used by being replaced with an index for selecting a list. In this case, pdsch-TimeDomainAllocationList-P may include at least one of information about a starting symbol in which a PDSCH is transmitted in a slot, information about the length of the PDSCH, or information about a slot offset.

For example, the Cap-P UE may obtain one or more TDRA tables through network signaling. One or more TDRA tables may include at least one of a first table (e.g., common to the Cap-L/P UEs) and/or a second table (e.g., supporting the Cap-P UE). Thereafter, the Cap-P UE that has received DCI may select a TDRA table to be used to receive a corresponding PDSCH from among one or more TDRA tables based on a CS_field value. The UE may obtain a TDRA value to be used in the selected TDRA table based on a TDRA field of the DCI. The UE may start receiving the PDSCH from a specific timing based on the TDRA value.

As another specific example to which Proposal 2-1 is applied, the information provided through CS_field may be used to represent an additional slot offset $k_{add}$. In this case, a method of additionally applying an offset of a size of $k_{add}$ to the TDRA value for scheduling the position of a PDSCH-L may be used for the transmission position of a PDSCH-P in the time domain Method of Dynamically Disabling Cross-Slot Scheduling Using CS Field When the method proposed in Proposal 2-1 is applied, (at least) one of states represented as CS_field may be configured/defined to designate disabling of cross-slot scheduling. CS_field for indicating the index of a TDRA table may also indicate the PDSCH-L. For example, when CS_field represents a slot offset $k_{add}$, slot offset $k_{add}=0$ may mean the PDSCH-L. In this case (e.g., indication of disabling cross-slot scheduling or indication of the PDSCH-L), the Cap-P UE may be determined not to expect reception of the PDSCH.

In this way, when a state for disabling cross-slot scheduling is defined, if there is no paging message for the Cap-P UE, an effect similar to UE sub-grouping may be obtained by causing the UE to omit PDSCH decoding.

(Proposal 2-2) Provision of Information Related to Cross-Slot Scheduling Using (Legacy) TDRA Field of Paging DCI Proposal 2-2 proposes a method of transmitting and receiving information related to cross-slot scheduling for a PDSCH scheduled through paging DCI through the paging DCI. For example, based on the Rel-16 NR standard, the information related to cross-slot scheduling may be provided using a TDRA field included in DCI format 1_0 in which a CRC is scrambled with a P-RNTI. This method is advantageous in that DCI resources may be saved because an additional DCI field/bit is not used to provide the information related to cross-slot scheduling. The Cap-L UE and the Cap-P UE may be configured/defined to interpret/acquire different information from the same TDRA field. The Cap-L UE may follow an interpretation method of the TDRA field defined in the Rel-16 NR standard or earlier releases and the Cap-P UE may follow an interpretation method of the TDRA field to which cross-slot scheduling is applied (a newly defined method according to the present embodiment).

Method of Applying New TDRA Table for Cap-P UE

As a specific method to which Proposal 2-2 is applied, a separate TDRA table for the Cap-P UEs (hereinafter referred to as a TDRA-P table) may be present, and the Cap-P UEs may be configured/defined to interpret information based on the TDRA-P table. For example, if the size of a TDRA table used to support legacy UEs (hereinafter referred to as TDRA-L table) based on DCI format 1_0 in which the CRC is scrambled with the P-RNTI is composed of 4 bits, the Cap-P UE may be configured/defined to receive the same 4 bits and interpret the 4 bits using the TDRA-P table. For example, a default TDRA-P table may be used, and the default TDRA-P table may be differently applied/configured according to a multiplexing pattern between an SS/PBCH block and a CORESET. This may be performed in the same way as a method in which the TDRA-L table is configured and selected by default and may be for the purpose of designating an appropriate scheduling value according to the type of multiplexing.

Method of Differently Applying Interpretation of Part of TDRA Table for Cap-P UE As a specific method to which Proposal 2-2 is applied, the Cap-P UE may be configured/defined so that some indexes of the TDRA-L table are interpreted as new values related to cross-slot scheduling. For example, based on DCI format 1_0 in which the CRC is scrambled with the P-RNTI, the size of the TDRA-L table may be composed of 4 bits to use a maximum of 16 states. Among the 16 states, n (<16) states may be determined and used as states (hereinafter referred to as TDRA_P states) in which a value to which cross-slot scheduling is applied is reflected for the Cap-P UE. In this case, the Cap-P UE may expect that the PDSCH-P will be received if the TDRA_P state is designated through DCI. If a state other than the TDRA_P state is designated, the Cap-P UE may be determined not to expect the PDSCH-P. In this case, Cap-L UEs follow the interpretation of the legacy TDRA-L table.

Method of Applying TDRA Using New Higher Layer Signaling for Cap-P UE

As a specific method to which Proposal 2-2 is applied, if pdsch-TimeDomainAllocationList for Cap-P UEs (hereinafter referred to as pdsch-TimeDomainAllocationList-P) is provided by pdsch-ConfigCommon included in an SIB, the Cap-P UEs may be configured/defined to determine TDRA based on pdsch-TimeDomainAllocationList-P configured. In this case, pdsch-TimeDomainAllocationList-P may be determined to include at least one of information about a starting symbol in which a PDSCH is transmitted in a slot, information about the length of the PDSCH, or information about a slot offset.

If there is no separate signaling bit indicating whether cross-slot scheduling is applied or not, and pdsch-TimeDomainAllocationList provided for legacy UEs (hereinafter pdsch-TimeDomainAllocationList-L) is provided by pdsch-ConfigCommon included in the SIB, the Cap-P UEs may expect that cross-slot scheduling will be applied only when pdsch-TimeDomainAllocationList-P for the Cap-P UEs is present and, otherwise, the Cap-P UEs may be configured/defined to perform the same operations as operations of the Cap-L UEs. This may be for the purpose of indicating cross-slot scheduling depending on whether or not pdsch-TimeDomainAllocationList-P has been configured instead of operating separate signaling indicating cross-slot scheduling.

If there is a separate signaling bit indicating whether cross-slot scheduling is applied, application of cross-slot scheduling is indicated by the bit, and pdsch-TimeDomainAllocationList-L is provided by pdsch-ConfigCommon included in the SIB, the Cap-P UE may be configured/defined to use a TDRA-P table selected based on a multiplexing pattern. This allows the BS to configure and transmit pdsch-TimeDomainAllocationList-P only when necessary while supporting cross-slot scheduling for the Cap-P UE, thereby obtaining an advantageous effect of reducing unnecessary network overhead.

If Proposal 2-2 is applied, pdsch-TimeDomainAllocationList-P is provided by pdsch-Config Common, and the size of a list (e.g., the number of entries in the list) provided by pdsch-TimeDomainAllocationList-P is smaller than the size (e.g., 4 bits) of a TDRA field configured in DCI (e.g. if the list consists of m elements, and ceiling (log m)<4), MSB bits not used to indicate the value of a TDRA-P may be determined to be a reserved state. This has an advantageous effect in increasing scheduling flexibility for the Cap-L UEs when the Cap-L UE and the Cap-P UE are simultaneously scheduled.

If Proposal 2-2 is applied and pdsch-TimeDomainAllocationList-P is provided by pdsch-Config Common, at least one bit may be designated to indicate that the PDSCH-P is not transmitted. This has the effect of UE sub-grouping so that the Cap-P UEs do not perform unnecessary PDSCH decoding when paging message transmission for the Cap-P UEs is not required.

For example, even if pdsch-TimeDomainAllocationList-P is provided/configured for the Cap-P UEs, whether pdsch-TimeDomainAllocationList-P is enabled or disabled may be determined based on separate signaling, for example, a MAC control element (CE). When pdsch-TimeDomainAllocationList-P is enabled, the Cap-P UE may follow pdsch-TimeDomainAllocationList-P rather than pdsch-TimeDomainAllocationList-L. When pdsch-TimeDomainAllocationList-P is disabled, the Cap-P UE may follow pdsch-TimeDomainAllocationList-L instead of pdsch-TimeDomainAllocationList-P. The present disclosure is not limited to the above example.

Figure 12:
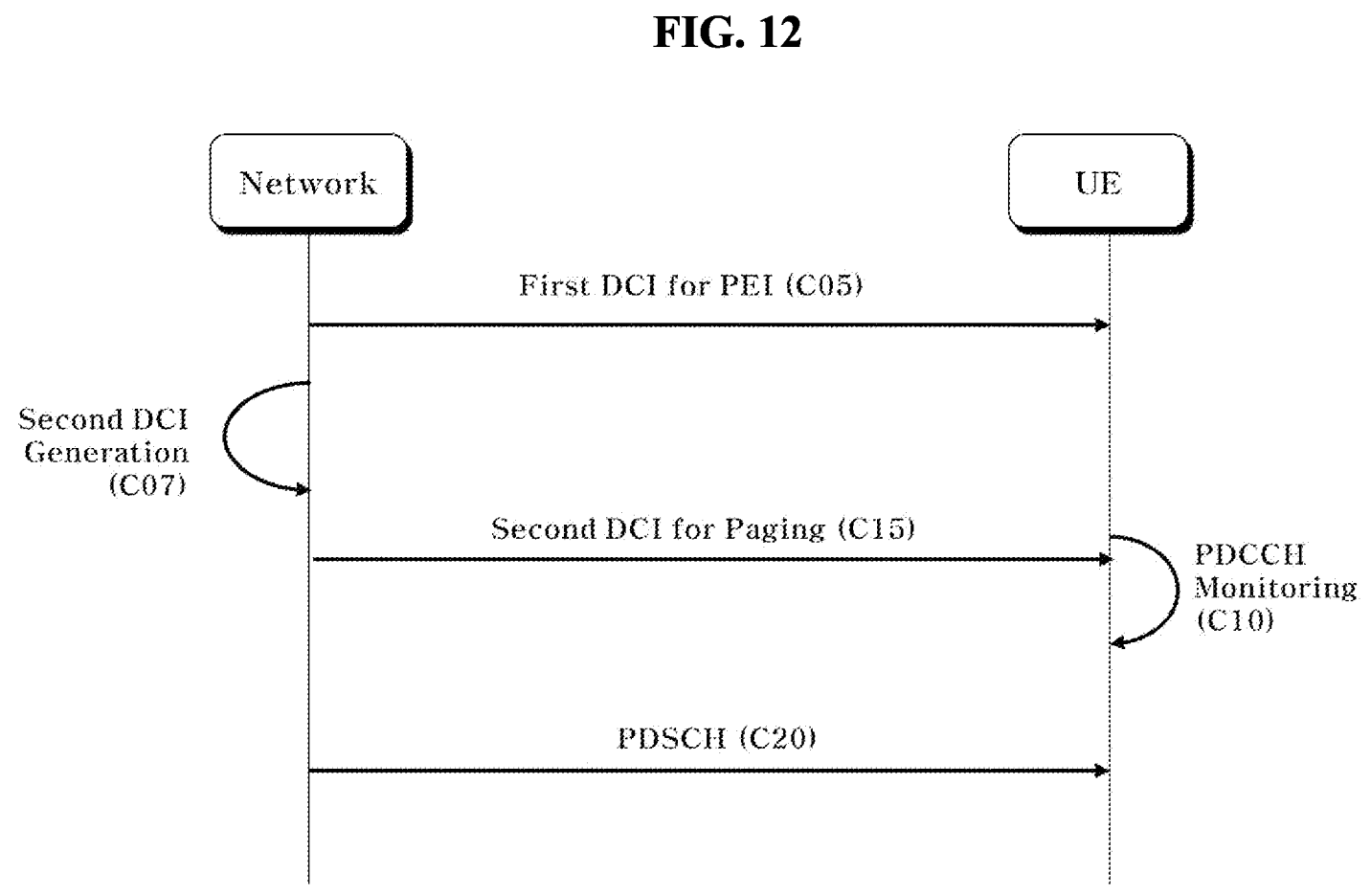

FIG. 12 illustrates a flow of a signal transmission/reception method according to an embodiment of the present disclosure. FIG. 12 illustrates an exemplary implementation of the above-described proposals, and the present disclosure is not limited to FIG. 12.

Referring to FIG. 12, a BS may transmit first DCI for a PEI to a UE in an RRC inactive state or an RRC idle state (C05). The UE may detect the first DCI for the PEI.

The UE may monitor, based on detection of the first DCI, second DCI for paging on a PO of a first slot related to the PEI (C10). The BS may transmit the second DCI for paging on the PO of the first slot related to the PEI (C15)

The UE may receive a paging message through a PDSCH scheduled by the second DCI (C20). The BS may transmit the paging message through the PDSCH scheduled by the second DCI.

Before monitoring the second DCI on the PO, the UE may determine, based on the first DCI for the PEI, whether the second DCI is configured to schedule the PDSCH in the first slot based on same-slot scheduling or configured to schedule the PDSCH in a second slot different from the first slot based on cross-slot scheduling.

The BS may indicate, to the UE through the first DCI for the PEI prior to transmission of the second DCI on the PO, whether the second DCI is configured to schedule the PDSCH in the first slot based on the same-slot scheduling or configured to schedule the second DCI in the second slot different from the first slot based on cross-slot scheduling.

The first DCI for the PEI may include at least one bit indicating whether the second DCI is configured for same-slot scheduling or configured for cross-slot scheduling.

The UE may determine, based on successful detection of the first DCI for the PEI, that the second DCI is configured based on cross-slot scheduling.

The first DCI for the PEI may include a first field related to TDRA of the PDSCH, and at least one of bit states of the first field may indicate enabling or disabling of cross-slot scheduling.

The UE may belong to a first UE sub-group from among the first UE sub-group supporting cross-slot scheduling and a second UE sub-group not supporting cross-slot scheduling.

In a state in which the second DCI is configured for cross-slot scheduling, the UE may acquire cross-slot scheduling information of the PDSCH through at least one of reserved bits, a TDRA field, or a cross-slot scheduling (CS) field of the second DCI.

The TDRA field may indicate a first slot offset (e.g., K-0 in FIG. 6) to be applied to the PDSCH, and the CS field may indicate second slot offset information (e.g., slot offset $k_{add}$ of Proposal 2-1) to be additionally applied to the PDSCH to which the first slot offset is applied.

The CS field may indicate any one of a plurality of TDRA tables configured for the UE, and the TDRA field may indicate any one entry in a TDRA table indicated by the CS field.

For example, the UE may be in an RRC inactive state or an RRC idle state.

Various descriptions, functions, procedures, proposals, methods, and/or operation flowcharts of the present disclosure may be applied to, but not limited to, various fields requiring wireless communication/connection (e.g., 5G) between devices.

Specific examples will be described in detail with reference to the drawings. In the following drawings/descriptions, the same reference numerals may denote the same or corresponding hardware blocks, software blocks, or functional blocks, unless otherwise indicated.

Figure 13:
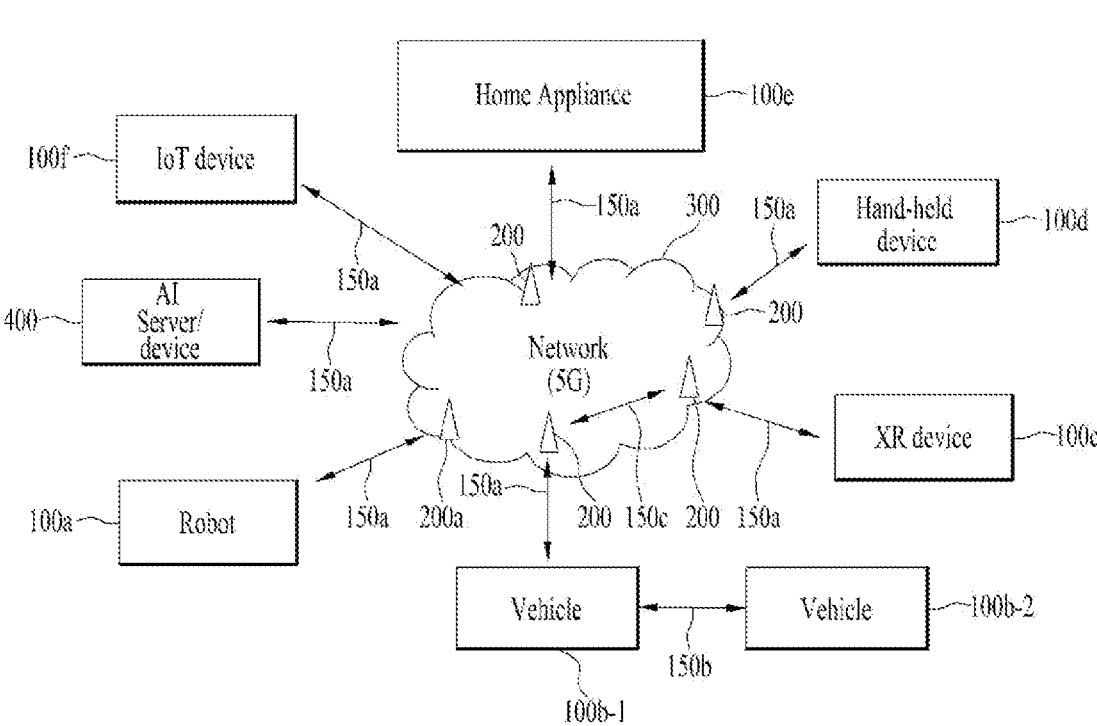
FIGS. 13 to 16 illustrate an example of a communication system 1 and wireless devices applicable to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
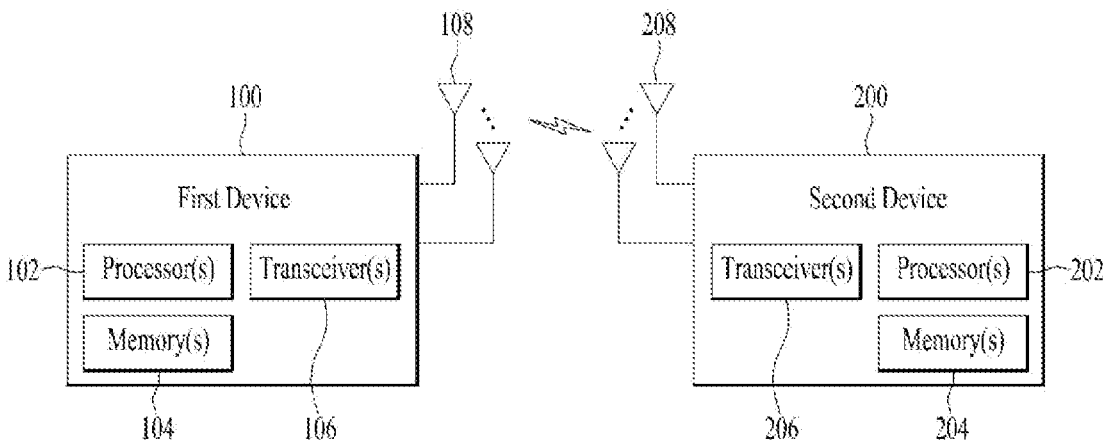

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
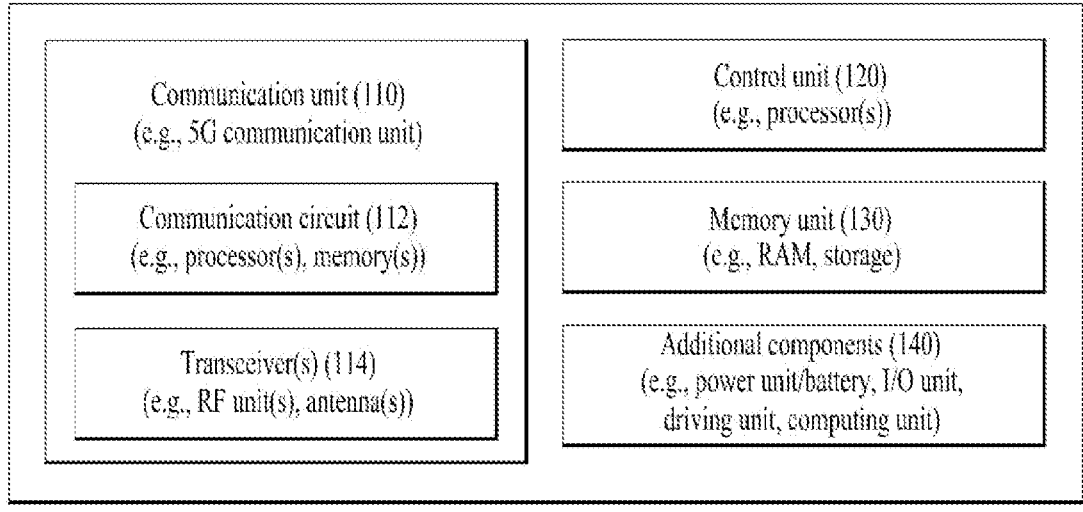

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
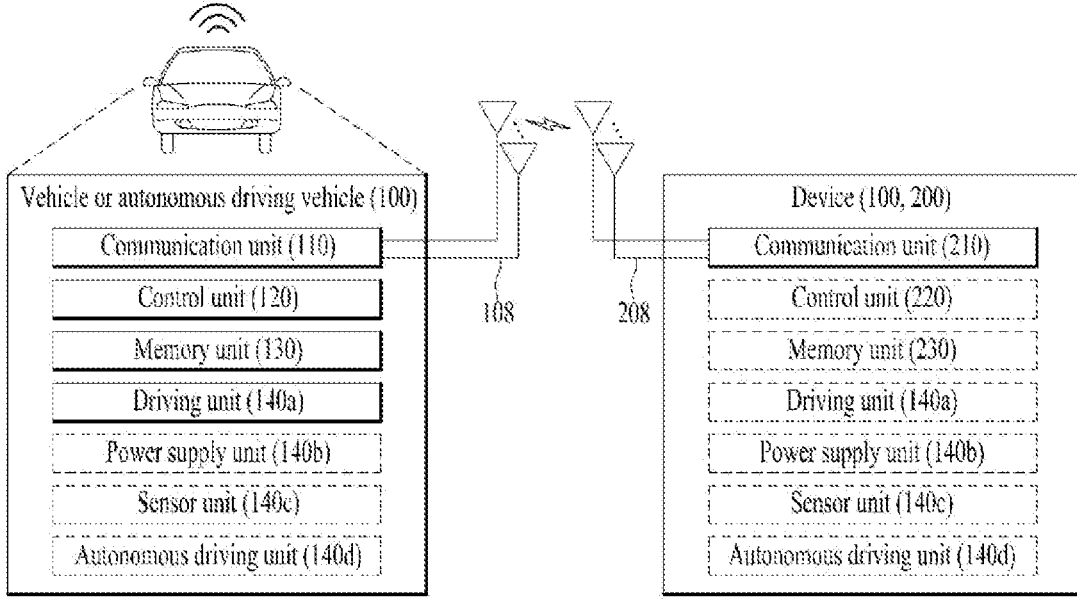

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
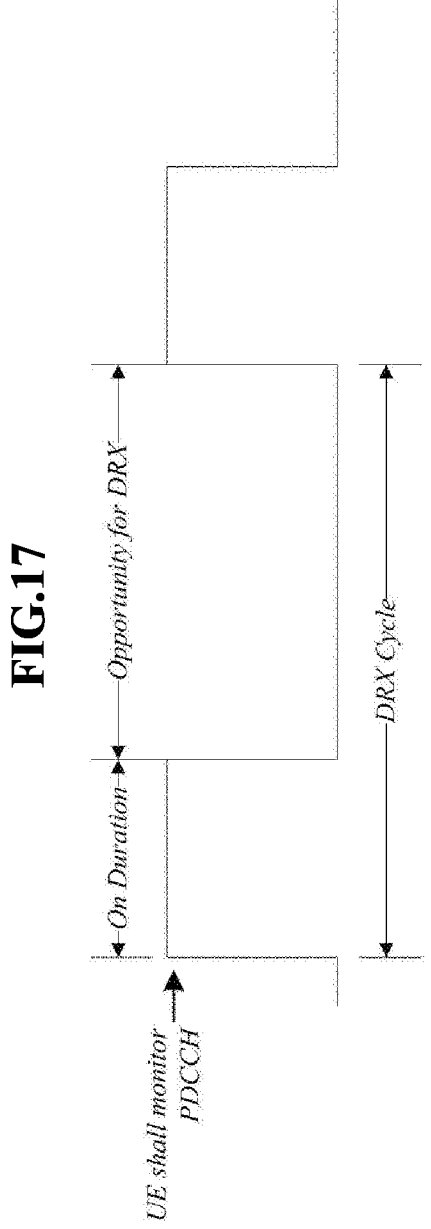
FIG. 17 illustrates an exemplary discontinuous reception (DRX) operation applicable to the present disclosure.

FIG. 17 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time duration between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 5

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method performed by a user equipment (UE), the method comprising:

detecting first downlink control information (DCI) for a paging early indicator (PEI);

monitoring, based on detection of the first DCI, second DCI for paging on a paging occasion (PO) of a first slot related to the PEI; and receiving a paging message through a physical downlink shared channel (PDSCH) scheduled by the second DCI, wherein the UE determines, before monitoring the second DCI on the PO, based on the first DCI for the PEI, whether the second DCI is configured to schedule the PDSCH in the first slot based on same-slot scheduling or configured to schedule the PDSCH in a second slot different from the first slot based on cross-slot scheduling, wherein, based on the second DCI being configured for cross-slot scheduling, the UE acquires cross-slot scheduling information of the PDSCH through at least one of a time domain resource allocation (TDRA) field or a cross-slot scheduling (CS) field of the second DCI, and wherein the TDRA field indicates a first slot offset to be applied to the PDSCH, and the CS field indicates second slot offset information to be additionally applied to the PDSCH to which the first slot offset is applied.

2. The method of claim 1, wherein the first DCI for the PEI includes at least one bit related to whether the second DCI is configured for same-slot scheduling or configured for cross-slot scheduling.

3. The method of claim 1, wherein the UE determines, based on successful detection of the first DCI for the PEI, that the second DCI is configured based on cross-slot scheduling.

4. The method of claim 1, wherein the UE belongs to a first UE sub-group from among the first UE sub-group supporting cross-slot scheduling and a second UE sub-group not supporting cross-slot scheduling.

5. The method of claim 1, wherein the UE is in a radio resource control (RRC) inactive state or an RRC idle state.

6. A non-transitory processor-readable recording medium in which a program for performing the method of claim 1 is recorded.

7. A device comprising:

a memory configured to store instructions; and a processor configured to operate by executing the instructions, wherein operations of the processor comprise: detecting first downlink control information (DCI) for a paging early indicator (PEI); monitoring, based on detection of the first DCI, second DCI for paging on a paging occasion (PO) of a first slot related to the PEI; and receiving a paging message through a physical downlink shared channel (PDSCH) scheduled by the second DCI, wherein the processor determines, before monitoring the second DCI on the PO, based on the first DCI for the PEI, whether the second DCI is configured to schedule the PDSCH in the first slot based on same-slot scheduling or configured to schedule the PDSCH in a second slot different from the first slot based on cross-slot scheduling, wherein, based on the second DCI being configured for cross-slot scheduling, the UE acquires cross-slot scheduling information of the PDSCH through at least one of a time domain resource allocation (TDRA) field or a cross-slot scheduling (CS) field of the second DCI, and wherein the TDRA field indicates a first slot offset to be applied to the PDSCH, and the CS field indicates second slot offset information to be additionally applied to the PDSCH to which the first slot offset is applied.

8. The device of claim 7, wherein the device is an application specific integrated circuit (ASIC) or a digital signal processing device.

9. The device of claim 7, wherein the device is a user equipment (UE) operating in a 3rd generation partnership project (3GPP) based wireless communication system.

10. A method performed by a base station (BS), the method comprising:

transmitting first downlink control information (DCI) for a paging early indicator (PEI) to a user equipment (UE);

transmitting second DCI for paging on a paging occasion (PO) of a first slot related to the PEI; and transmitting a paging message through a physical downlink shared channel (PDSCH) scheduled by the second DCI, wherein the BS indicates, before transmission of the second DCI on the PO, through the first DCI for the PEI, to the UE whether the second DCI is configured to schedule the PDSCH in the first slot based on same-slot scheduling or configured to schedule the PDSCH in a second slot different from the first slot based on cross-slot scheduling, wherein, based on the second DCI being configured for cross-slot scheduling, the BS indicates cross-slot scheduling information of the PDSCH through at least one of a time domain resource allocation (TDRA) field or a cross-slot scheduling (CS) field of the second DCI, and wherein the TDRA field indicates a first slot offset to be applied to the PDSCH, and the CS field indicates second slot offset information to be additionally applied to the PDSCH to which the first slot offset is applied.

11. A device comprising:

a memory configured to store instructions; and a processor configured to operate by executing the instructions, wherein operations of the processor comprise: transmitting first downlink control information (DCI) for a paging early indicator (PEI); transmitting second DCI for paging on a paging occasion (PO) of a first slot related to the PEI; and transmitting a paging message through a physical downlink shared channel (PDSCH) scheduled by the second DCI, wherein the device indicates, before transmission of the second DCI on the PO, through the first DCI for the PEI, to a user equipment (UE) whether the second DCI is configured to schedule the PDSCH in the first slot based on same-slot scheduling or configured to schedule the PDSCH in a second slot different from the first slot based on cross-slot scheduling, wherein, based on the second DCI being configured for cross-slot scheduling, the device indicates cross-slot scheduling information of the PDSCH through at least one of a time domain resource allocation (TDRA) field or a cross-slot scheduling (CS) field of the second DCI, and wherein the TDRA field indicates a first slot offset to be applied to the PDSCH, and the CS field indicates second slot offset information to be additionally applied to the PDSCH to which the first slot offset is applied.

* * * * *